(12) United States Patent
Lockerbie et al.

(10) Patent No.: US 9,137,091 B2
(45) Date of Patent: Sep. 15, 2015

(54) DYNAMIC QUALITY OF SERVICE FOR CONTROL OF MEDIA STREAMS USING FEEDBACK FROM THE LOCAL ENVIRONMENT

(71) Applicant: Novatel Wireless, Inc., San Diego, CA (US)

(72) Inventors: Ian Lockerbie, Calgary (CA); Jordan McLeod, Calgary (CA); Wayne Kushneryk, Calgary (CA)

(73) Assignee: Novatel Wireless, Inc., San Diego, CA (US)

( * ) Notice: Subject to any disclaimer, the term of this patent is extended or adjusted under 35 U.S.C. 154(b) by 276 days.

(21) Appl. No.: 13/772,224

(22) Filed: Feb. 20, 2013

(65) Prior Publication Data

US 2014/0237079 A1   Aug. 21, 2014

(51) Int. Cl.

| H04L 29/06 | (2006.01) |
| H04L 29/08 | (2006.01) |
| H04N 21/214 | (2011.01) |
| H04N 21/24 | (2011.01) |
| H04N 21/422 | (2011.01) |
| H04N 21/4363 | (2011.01) |

(52) U.S. Cl.
CPC .......... *H04L 29/08099* (2013.01); *H04L 65/80* (2013.01); *H04N 21/2146* (2013.01); *H04N 21/2408* (2013.01); *H04N 21/42203* (2013.01); *H04N 21/43637* (2013.01)

(58) Field of Classification Search
CPC .. H04L 29/08099; H04L 65/80; H04N 21/00; H04N 21/2146; H04N 21/2408; H04N 21/42203; H04N 21/43637
USPC ........... 709/218, 224, 231; 455/456.1–456.3, 455/457
See application file for complete search history.

(56) References Cited

U.S. PATENT DOCUMENTS

| 7,197,557 | B1 * | 3/2007 | Asar et al. ..................... 709/224 |
| 8,331,901 | B2 * | 12/2012 | Raleigh ........................ 455/405 |
| 8,898,803 | B1 * | 11/2014 | Hostetter et al. ................ 726/28 |
| 2002/0147814 | A1 * | 10/2002 | Kimchi et al. ............... 709/226 |
| 2004/0153561 | A1 * | 8/2004 | Dalal et al. .................... 709/231 |
| 2006/0270465 | A1 * | 11/2006 | Lee et al. .................. 455/569.1 |
| 2007/0006268 | A1 * | 1/2007 | Mandera et al. ................ 725/80 |
| 2007/0237098 | A1 * | 10/2007 | Wang ............................. 370/256 |
| 2009/0190687 | A1 * | 7/2009 | Moon et al. ................... 375/267 |
| 2009/0204719 | A1 * | 8/2009 | Simongini et al. ............ 709/231 |
| 2010/0234071 | A1 * | 9/2010 | Shabtay et al. ............ 455/562.1 |
| 2013/0107741 | A1 * | 5/2013 | Huang et al. .................. 370/252 |
| 2013/0268577 | A1 * | 10/2013 | Oyman ........................ 709/203 |

(Continued)

Primary Examiner — Alina N Boutah
(74) Attorney, Agent, or Firm — TechLaw LLP

(57) ABSTRACT

Systems and methods are provided that allow a media streaming device to dynamically control the quality of service associated with streaming media content being presented to a user. To dynamically control the quality of service associated with the streaming media content, the local environment in which the media streaming device, and one or more downstream devices which may be configured to receive the streaming media content, if present, operate, is monitored. Feedback regarding the status of the local environment can be gleaned based on the monitoring, and based on the feedback, the quality of service associated with the streaming media content can be adjusted accordingly, or the streaming media content may be paused, altogether terminated, maintained, or initiated/re-initiated. To further refine the feedback, user behavior may also be monitored, which can be suggestive of a user's attentiveness to the streaming media content.

32 Claims, 13 Drawing Sheets

(56) References Cited

U.S. PATENT DOCUMENTS

| | | | |
|---|---|---|---|
| 2013/0286868 A1* | 10/2013 | Oyman et al. | 370/252 |
| 2013/0329550 A1* | 12/2013 | Kotecha et al. | 370/230 |
| 2014/0040498 A1* | 2/2014 | OYMAN et al. | 709/231 |
| 2014/0075015 A1* | 3/2014 | Chan et al. | 709/224 |
| 2014/0168354 A1* | 6/2014 | Clavel et al. | 348/14.09 |
| 2014/0185828 A1* | 7/2014 | Helbling | 381/103 |
| 2014/0201329 A1* | 7/2014 | Himayat et al. | 709/219 |
| 2014/0219088 A1* | 8/2014 | Oyman et al. | 370/231 |

\* cited by examiner

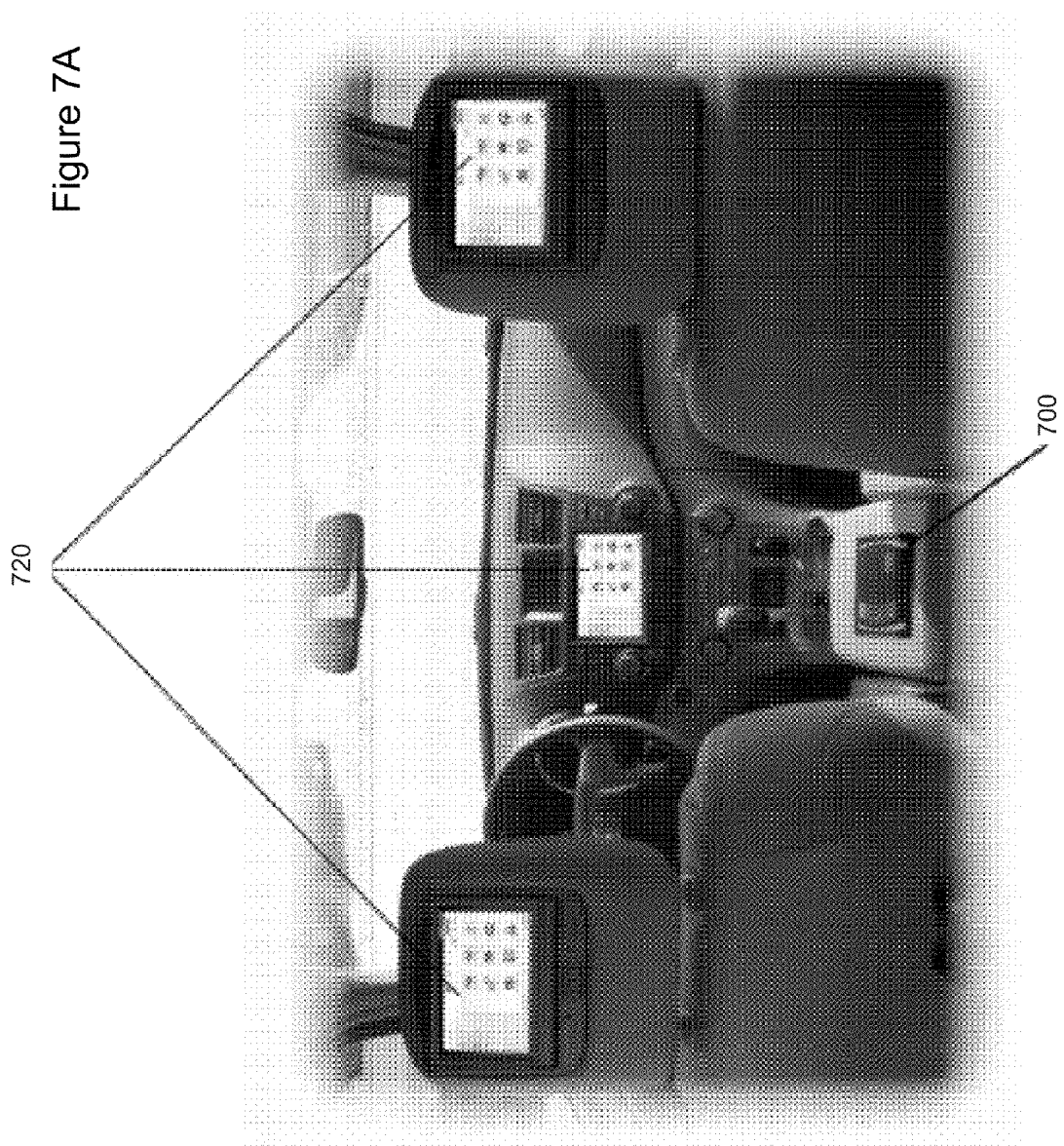

DYNAMIC QUALITY OF SERVICE FOR CONTROL OF MEDIA STREAMS USING FEEDBACK FROM THE LOCAL ENVIRONMENT

TECHNICAL FIELD

The present application relates generally to portable communications devices, and more particularly, to media streaming devices and methods for controlling media stream transmission using feedback from the local environment.

BACKGROUND

Wireless modems exist that can be inserted, or otherwise interfaced with a computer and that enable data communication over a wireless Wide Area Network (WWAN) such as a cellular type network. Early versions of these wireless modems were embodied as cards that had connectors that complied with the Personal Computer Memory Card International Association (PCMCIA) standard and that were inserted into a slot in the side of the computer. Newer versions have USB connectors, WiFi connectivity, Bluetooth connectivity, or other data interfaces for interfacing with one or more computers or media devices (TV, stereo, iPad®, PDAs, etc.) Such wireless modems allow access to the Internet, or World Wide Web (WWW), even where no wired network connection exists.

FIG. 1 illustrates a conventional system 100 in which a data connection can be established over a wide area network using a conventional wireless modem 104. In FIG. 1, the conventional wireless modem 104 may be interfaced, e.g., via a PCMCIA slot or Universal Serial Bus (USB) connection, with a host computing device 106 via a connection 110. The conventional wireless modem 104 may then establish a data connection between a base station 102, associated with, e.g., a cellular-type network, and the host computing device 160, e.g., a personal computer (PC). The conventional wireless modem 104 and the base station 102 can communicate via wireless signals 108.

FIG. 2 is a flow chart illustrating a conventional process by which the aforementioned data connection can be established. At 202, a user of the host computing device 106 may insert, or otherwise connect the conventional wireless modem 104 with the host computing device 106. At 204, the conventional wireless modem 104 may then be tethered to the host computing device 106. Once the conventional wireless modem 104 is tethered to the host computing device 106, a connection manager running on the host computing device 106 can be launched at 206. The connection manager will often display whether the network, i.e., the WWAN, is available through a user interface. If it is, at 208, the user can select the network, which will cause a connection to be established between the base station 102 and the host computing device 106 via the conventional wireless modem 104 at 210. The connection can use any standard protocol, including Point to Point Protocol (PPP), Transmission Control Protocol/Internet Protocol (TCP/IP), Bluetooth®, or any communication protocol.

For example, PPP can refer to a data link protocol commonly used to establish a direct connection between two networking nodes. It can provide connection authentication, transmission encryption privacy, and compression. PPP can be used over many types of physical networks including serial cable, phone line, trunk line, cellular telephone, specialized radio links, and fiber optic links such as Synchronous Optical Networking (SONET). PPP is designed to work with numerous network layer protocols, including Internet Protocol (IP), Novell's Internetwork Packet Exchange (IPX), NBF, and AppleTalk.

SUMMARY

Various embodiments are set out in the claims. The various embodiments are directed to monitoring a local environment and obtaining feedback regarding the status of the local environment to adjust the quality of service associated with streaming media content, or otherwise pausing, terminating, maintaining, or initiating/re-initiating the streaming media content. To further refine the feedback, user behavior may also be monitored, which can be suggestive of a user's attentiveness to the streaming media content. Accordingly, various embodiments may be applicable in most any capacity-limited application/scenario to improve data consumption performance, e.g., where network capacity and resources are limited, expensive to increase, etc., and/or the amount of data traveling through the network is a significant percentage of the network load.

According to a first embodiment, a local environment in which a media streaming device operates may be monitored. Feedback from the local environment regarding a status of the local environment as a result of the monitoring may be received. Additionally, treatment of streamed/streaming media content routed to or from the media streaming device based on the status of the local environment may be determined.

According to a second embodiment, an apparatus may include a processor, and at least one memory unit including computer program code, the at least one memory unit and the computer program code configured to, with the at least one processor, cause the apparatus to perform at least the following processes. Utilizing a first radio module, a first wireless connection to a base station associated with a wide area network (WAN) may be established. Utilizing a second radio module, a second wireless connection may be established with at least one downstream device to establish a wireless local area network (WLAN) between the at least one downstream device and the apparatus. Additionally, a media stream may be transmitted to the at least one downstream device in accordance with a quality of service determined based on feedback from a local environment in which at least one of the apparatus and the at least one downstream device operate.

According to a third embodiment, an apparatus may include a processor, and at least one memory unit including computer program code, the at least one memory unit and the computer program code configured to, with the at least one processor, cause the apparatus to perform at least the following processes. Utilizing a first interface, a first wired connection to a router associated with a wide area network (WAN) may be established. Utilizing a second interface, a second wired connection may be established with at least two downstream devices to establish a local area network (LAN) between the at least one downstream device and the apparatus. Additionally, a media stream may be transmitted to the at least one downstream device in accordance with a quality of service determined based on feedback from a local environment in which at least one of the apparatus and the at least one downstream device operate.

BRIEF DESCRIPTION OF THE DRAWINGS

For a more complete understanding of example embodiments, reference is now made to the following descriptions taken in connection with the accompanying drawings in which:

FIG. 7A is a diagram illustrating an example IMHS configured for use in a vehicle for streaming media in accordance with various embodiments;

DETAILED DESCRIPTION OF THE DRAWINGS

Example embodiments and their potential advantages are understood by referring to FIGS. 1-9 of the drawings.

In accordance with various embodiments, an IMHS can refer to an apparatus or device having, e.g., a local area network radio interface; a display interface; a user interface including at least one of a switch, button, or input (collectively an input); non-transitory memory configured to store instructions; and a processor coupled with memory, the instructions configured to cause the processor to perform the following in response to an activation of the input: automatically establish a data connection with a host computing device over the local area network, or automatically establish a data connection with a media presentation device over the display interface.

In accordance with various embodiments, an IMHS may be used to interface one or more host computing devices or Local Area Network (LAN) client devices with a WWAN. For example, the WWAN can be configured to implement one of the Third Generation (3G) protocols, such as EDGE, CDMA2000, or the Universal Mobile Telecommunications System (UMTS) protocols, High Speed Packet Access (HSPA) or HSPA+ protocols, Long Term Evolution (LTE) protocols, Evolution Data Optimization (EV-DO) rev. A (DOrA), WiMAX, or other newer protocols. The host computing devices may interface with the IMHS over a wireless Local Area Network (LAN) such as a WiFi network, wireless USB network, ultrawideband network, Bluetooth®, Ethernet or a Zigbee network.

However, it should be understood that the descriptions that follow are not intended to limit the embodiments herein to particular standards or architectures. Rather, the embodiments disclosed herein are being provided by way of example only. Additionally, and while the embodiments disclosed herein are described in the context of an IMHS, it should be understood that other devices, apparatuses, and/or systems capable of streaming media content may be improved upon by dynamic Quality of Service (QoS) control of media streams using local environment feedback (as will be described in greater detail below). It should also be noted that QoS may refer to both network quality, as well as general subjective and objective performance, including but not limited to improvements due to higher bandwidth, better compression, etc.

Figure 1:
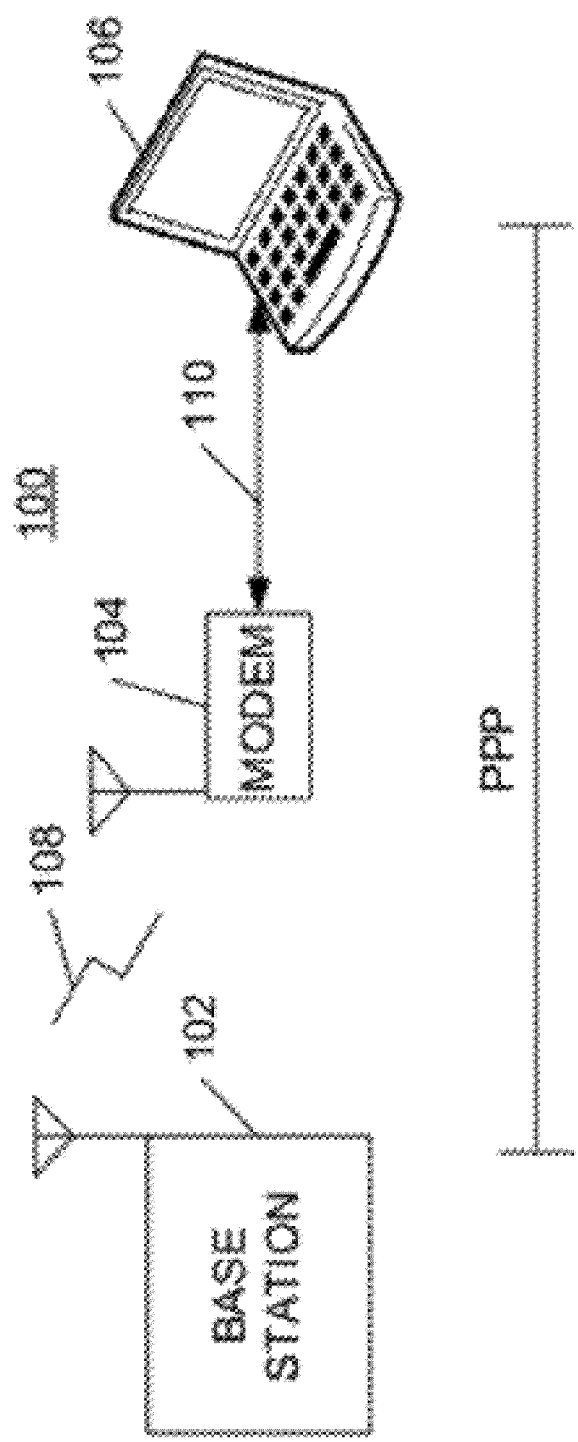
FIG. 1 is a diagram illustrating an example conventional system for using a wireless modem to access a WAN.
Figure 2:
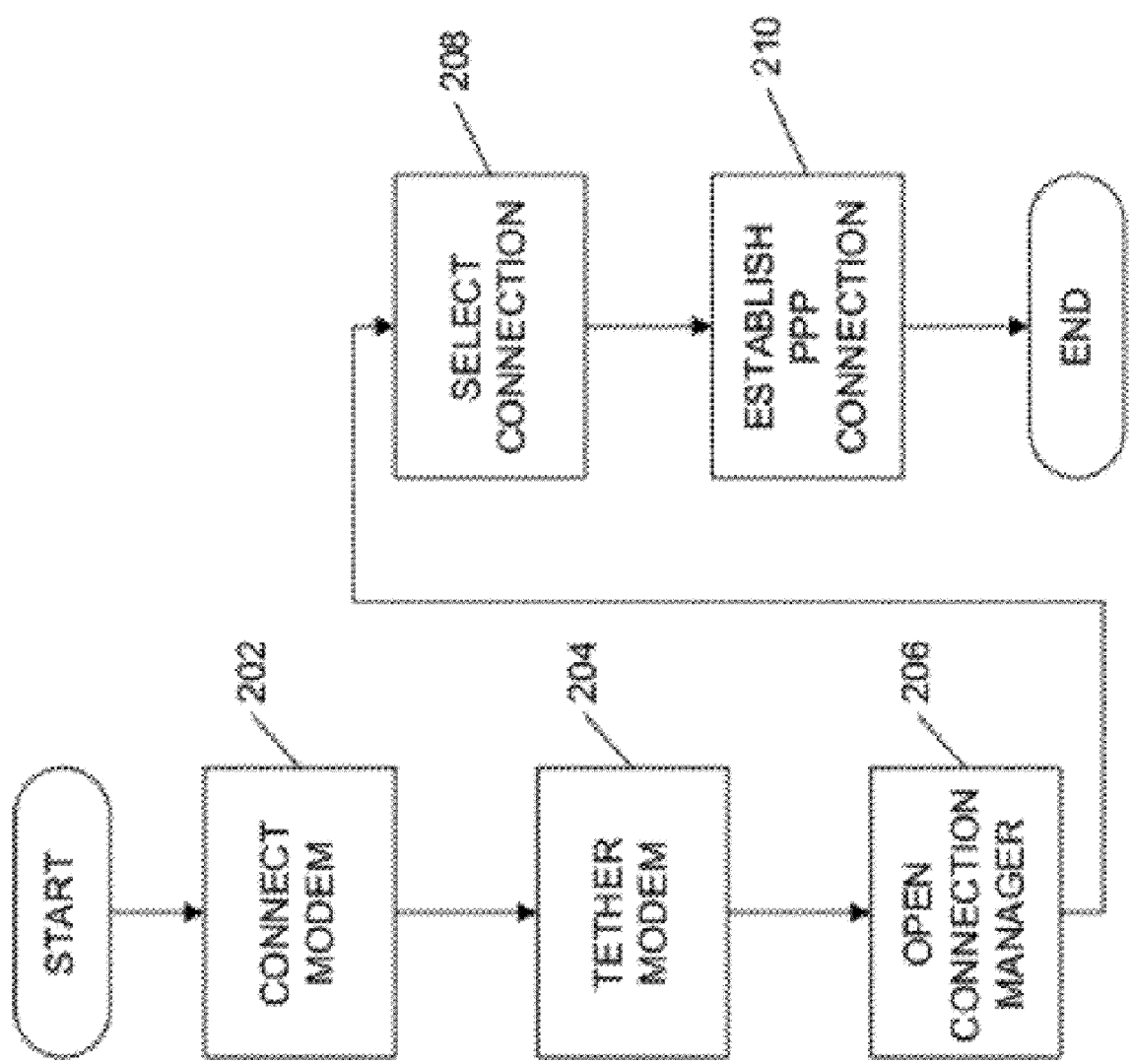
FIG. 2 is a flow chart illustrating example processes for establishing a data connection using a modem in the example conventional system of FIG. 1.
Figure 3:
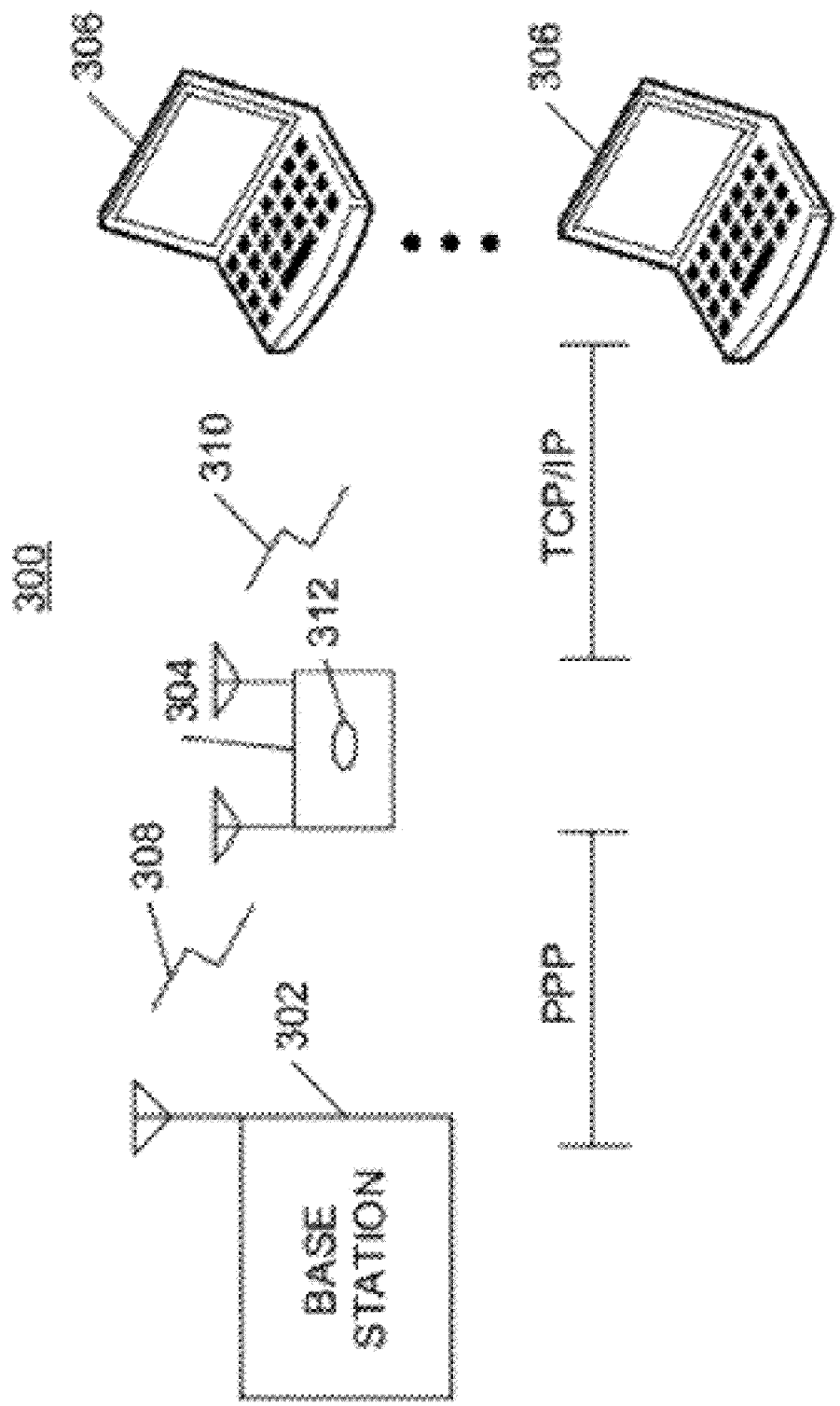
FIG. 3 is a diagram illustrating an example system for using an Intelligent Mobile HotSpot (IMHS) to access a WAN in accordance with various embodiments.

FIG. 3 is a diagram illustrating an example system 300 for using an IMHS to access a WAN, e.g., a WWAN, in accordance with one embodiment. Central to system 300 is IMHS 304. While not illustrated in detail in FIG. 3, IMHS 304 can comprise two radio communication interfaces: one for communicating with a base station 302 associated with a WWAN, and one for communicating with one or more host computing devices, such as wireless LAN (WLAN) client devices, 306 via a WLAN. Thus, IMHS 304 can communicate with base station 302 via wireless signals 308 and with host computing devices 306 via wireless signals 310, where signals 308 and 310 implement different protocols associated with the related network.

Figure 4:
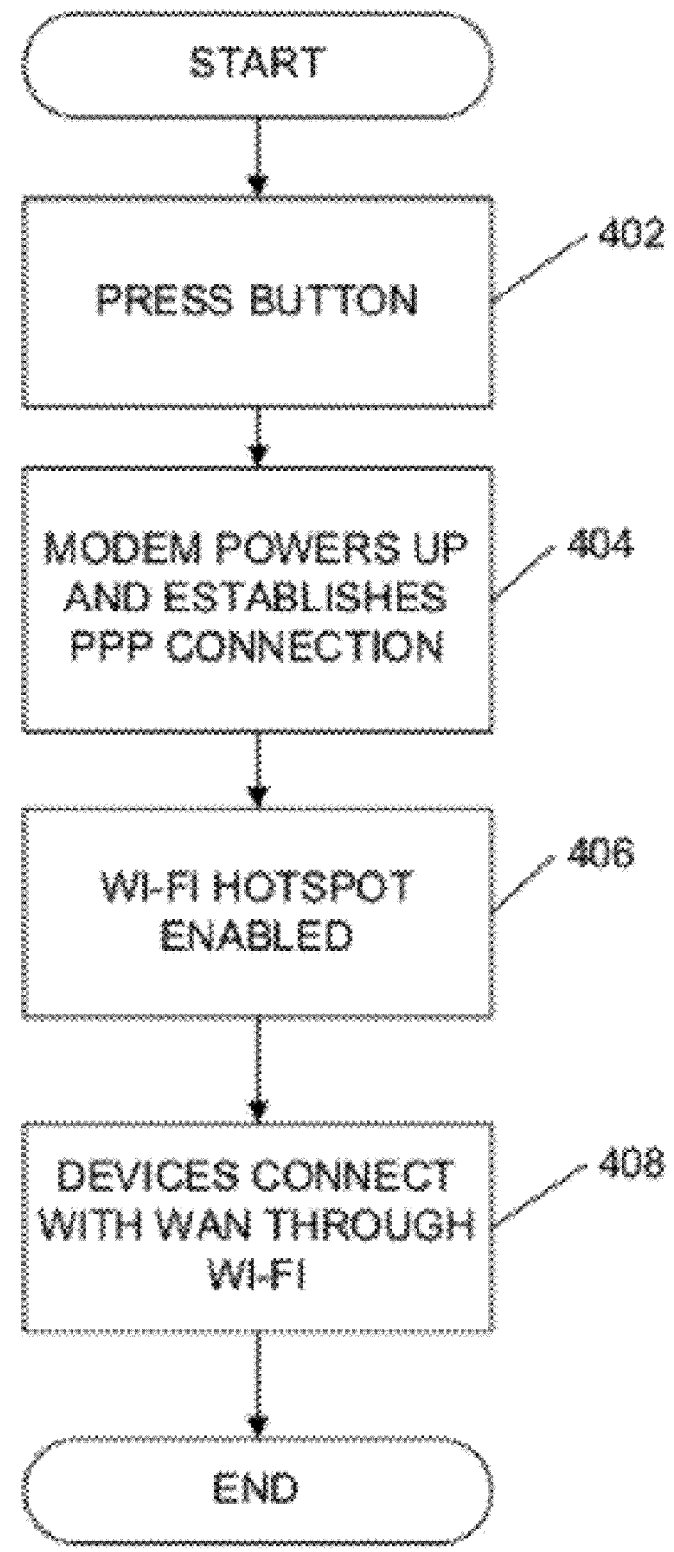
FIG. 4 is a flow chart illustrating example processes for establishing a data connection using an IMHS in the example system of FIG. 3.

FIG. 4 is a flow chart illustrating an example process by which devices 306 can be interfaced with base station 302. Referring back to FIG. 3, IMHS 304 can include a single power button, or switch 312, that a user can press to power on IMHS 304 at 402. Upon powering up, the IMHS 304 can automatically establish a data connection, e.g., a PPP connection, with base station 302 at 404. As illustrated, this PPP connection may be between base station 302 and IMHS 304. At 406, IMHS 304 may enable the WLAN, and at 408, the host computing devices 306 can automatically connect to the WWAN through IMHS 304 and the WLAN connections 310. In other words, IMHS 304 can act as a WLAN access point for the host computing devices 306. Communication between IMHS 304 and the host computing devices 306 can be via Transmission Control Protocol (TCP)/IP over WiFi. In certain embodiments, the users of the host computing devices 306 may provide a password when accessing the WLAN. Accordingly, an in certain embodiments, the IMHS 304 may automatically establish a connection with the WWAN and enable the WLAN hotspot in response, without tethering of the IMHS 304 with the host computing devices 306.

Figure 5:
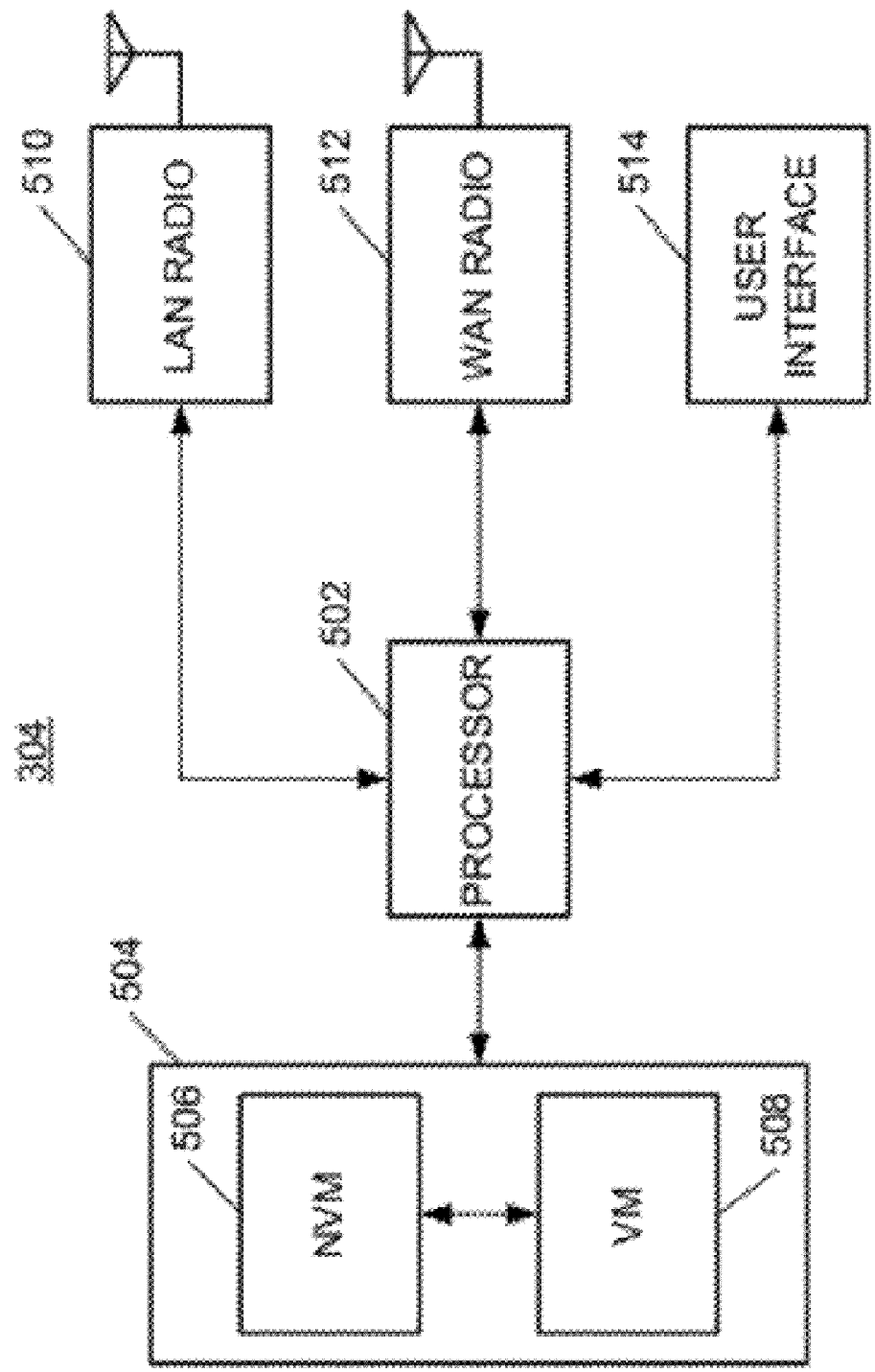
FIG. 5 is a diagram illustrating example components that may be included in an IMHS in the example system of FIG. 3.

FIG. 5 is a diagram illustrating certain components that can be included in IMHS 304 in accordance with one embodiment. It will be understood that more or less components can be included in IMHS 304. The example of FIG. 5 is not intended to exhaustively show all components, but rather illustrate by way of example, certain components in relation to the systems and methods described herein. As such, the example of FIG. 5 should not be seen as limiting the systems and methods described herein to a certain design or architecture. Moreover, the components illustrated in FIG. 5 are depicted at a high level, and it will be understood that the components can actually be implemented via multiple components such as multiple integrated circuits, discrete device, or both, and can be packaged in a single package or in multiple packages. It will also be understood that IMHS 304 is often battery powered and therefore can include a battery (not shown).

Referring to FIG. 5, IMHS 304 can include a processor 502 interfaced with memory 504, a LAN radio 510, a WAN radio 512, and a user interface 514. Processor 502 can often include several processing cores such as a digital signal processing core, a microprocessing core, math-coprocessors, etc.

Memory 504 can include several forms of memory, such as non-volatile memory 506 and volatile memory 508. Non-volatile memory can be used to store data and instructions that should be maintained even when power is removed from IMHS 304. Volatile memory can be used to store instructions and data for which it is not important whether it is maintain when power is removed. For example, the code used to run IMHS 304 can be stored in non-volatile memory 506 such that it is maintained even when IMHS 304 is turned off, and so that IMHS 304 can access this code when it is turned on again. However, such code can be copied to volatile memory 508 when IMHS 304 is on. This can, for example, allow faster access to instructions and data by processor 502.

Examples of non-volatile memory include Read-Only Memory (ROM), flash memory, and most types of magnetic computer storage devices, e.g., hard disks, floppy disks, and magnetic tape and optical discs, although these later devices are not generally used for IMHS 304. Examples of volatile memory may include random access memory (RAM), including Dynamic Random Access Memory (DRAM) and static random access memory (SRAM). Accordingly, IMHS 304 can include DRAM, SRAM, or some combination thereof. In certain embodiments, some portion or even all of non-volatile memory 506, volatile memory 508, or both can be included with processor 502.

LAN radio 510 can include all of the hardware required for the radio front end of the wireless LAN interface. Similarly, WAN radio 512 can include all of the hardware required for the radio front end of the wireless WAN interface. Processor 502 or components thereof can serve as the processing back-end for both radios 510 and 512. Alternatively, separate processing circuitry can be included for each of the LAN function and the WAN function. In such embodiments, the processing functionality described herein can be included in either the LAN processing circuitry or the WAN processing circuitry.

User interface 514 can comprise a button 312, or in accordance with other embodiments, a display, e.g., to display a password, or interactive mechanisms.

Instructions stored in memory 504 can be used by processor 502 to control the operation of IMHS 502 including control of radios 510 and 512. Thus, the instructions stored in memory 504 can include instructions for controlling the operation of radios 510 and 512 as well as for bridging communications between base station 320 and host computing devices 306, as well as for configuring IMHS 304. In certain embodiments, the instructions for controlling WAN radio 512, and the authentication procedures for connecting to the WAN, can be included in standard code associated with WAN radio 512. These instructions can be referred to as modem instructions. Separate instructions for controlling the remaining functions of IMHS 304 can then also be stored in memory 504, including the procedures and settings for controlling LAN radio 510. These instructions can be referred to as router instructions.

Referring back to FIG. 3, and once IMHS 304 is powered up, a connection with base station 302 can be established, the LAN, e.g., WLAN, may be activated, and IMHS 304 will be ready to route data packets from the host computing device(s) 306 to base station 302. Host computing device(s) 306 can then access, e.g., the Internet, through IMHS 304.

The acceptance and availability of new technologies can increase the functionality of an IMHS 304 and enable greater convergence within the home and in the vehicle. For example, the deployment of 4G LTE and the expansion of WiMAX in, e.g., the United Stated suggests that throughput for WWANs can exceed fixed lines speeds in many markets, e.g., 5-12 Mbps. Further, the cost per byte relative to 3G may go down significantly and 4G devices may be increasingly affordable. Moreover, the availability of new smart phone operating systems that provide free and open access, and access to an established application development community will also increase the availability of applications that can take advantage of all new, faster networks.

In addition, the availability of small, cost effective, low power, media processors for portable devices that can provide processing speeds of greater than, e.g., 1 GHZ, can increase the types of media applications that can be included in smaller portable devices. Examples include the Qualcomm® Snap-Dragon™, Texas Instruments™ (TI) Open Multimedia Applications Platform (OMAP™), Intel® Atom™, and others. Further, new compression technology is enabling the business case for mobile media downloads/streaming.

Accordingly, in certain embodiments, an IMHS such as described above can serve as a media server that can, for example, connect with a television, stereo/radio, set-top box, or other in home media presentation device. Additionally, or alternatively, an IMHS may operate as a media streaming device that may relay or route media to, e.g., a television, stereo/radio or other in home media presentation device. Such an IMHS can include such hardware and software as a graphics processor, web server, media gateway, applications layer, etc. The IMHS can then be configured to interface with one or more such media presentation devices, and allow users to access content through the IMHS and display the content on the one or more media presentation devices. This is illustrated in the example systems of FIGS. 6A and 6B.

Figure 6A:
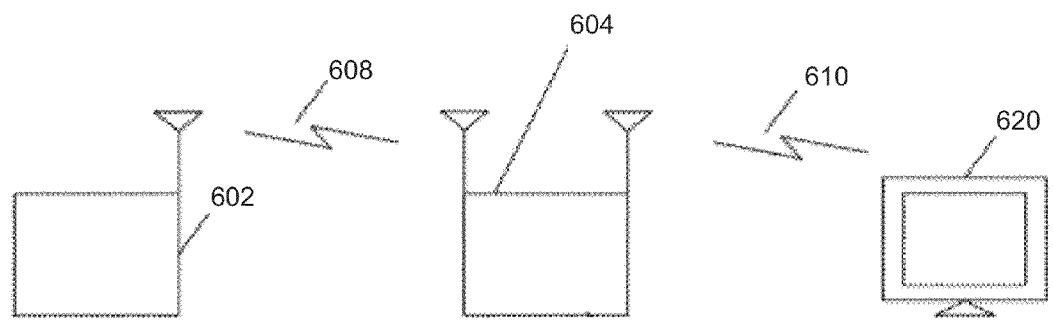
FIGS. 6A-6C are diagrams illustrating an example IMHS configured as a media server in accordance with various embodiments.
Figure 6B:
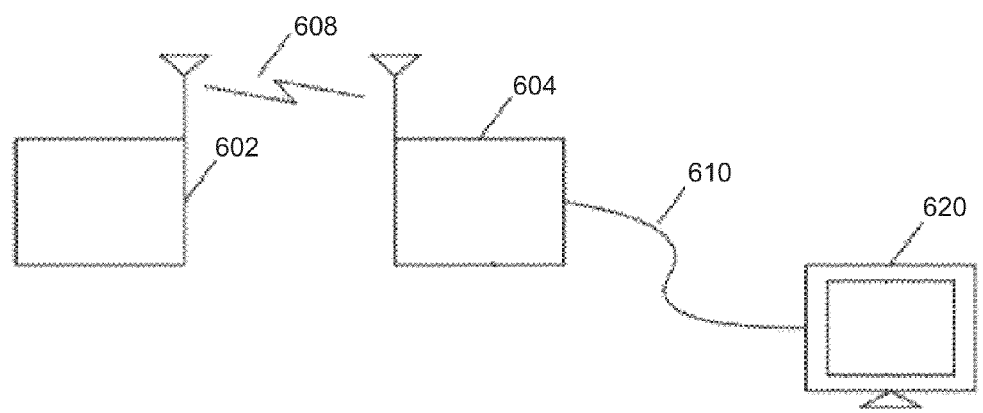
Figure 6C:
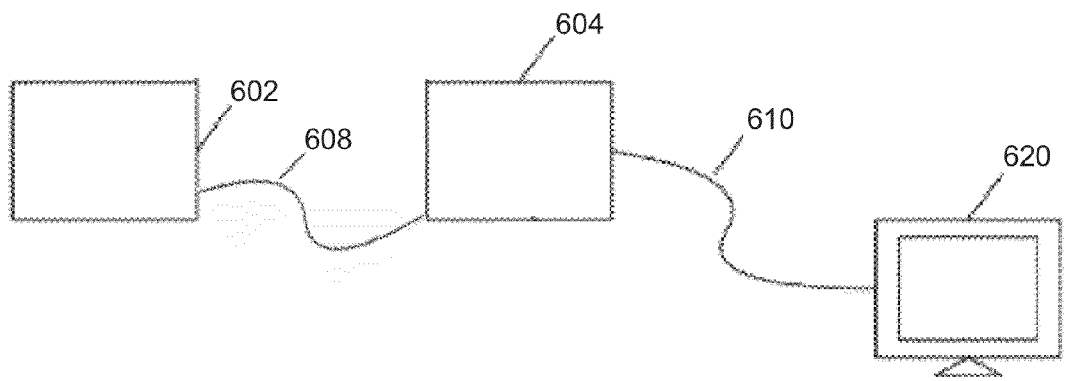
Figure 6D:
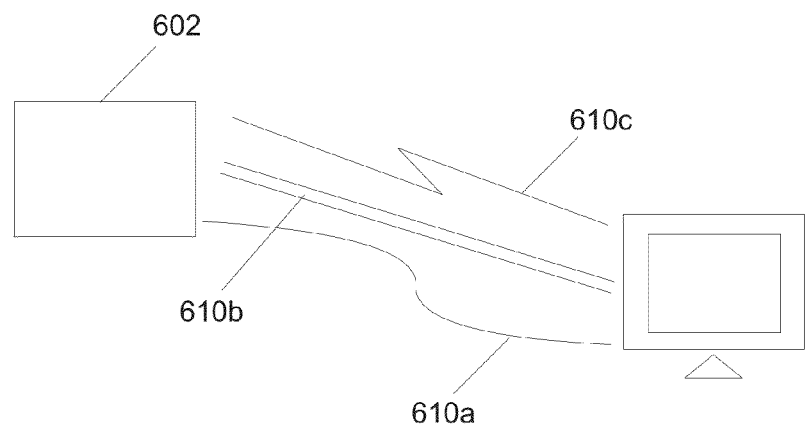
FIG. 6D is a diagram illustrating an example of a media server communicating with an end device, where the communications link may be wired, wireless or optical.

In FIG. 6A, IMHS 604 may be wirelessly interfaced with television 620. In FIG. 6B, IMHS 604 is connected with television 620 via a wired connection. In FIG. 6C, the IMHS 604 may be connected with the television 620 and a router 602 via a wired connection. The connection between IMHS 604 and television 620 can be accomplished via wireless communication 608, e.g., infra red, WiFi, WWAN, Wireless High-Definition Multimedia Interface (HDMI), Ultra-wideband (UWB), a cable 610, or other means of wireless communication. Cable 610 can, for example, be an HDMI cable, USB cable, or other cable capable of carrying information including audio and visual information. Thus, IMHS 604 can include a radio module for wirelessly connecting to the television 620 and/or a cable connection port or interface configured to connect with cable 610. IMHS 604 may also be wirelessly connected via radio signals with a base station or router 602, or alternatively, IMHS 604 may be connected via a cable or other wired connection to router 602. Base station or router 602 can be part of the WWAN or part of a LAN/WLAN, e.g., within the home, or both, depending on the embodiment. Once connected, IMHS 604 can be configured to provide/present media, applications, etc. on the television 620 (or other media presentation device). As yet another alternative, FIG. 6D illustrates a scenario where the television 620 may be connected directly to the router 602 (via a wired link 610a, such as a cable, optical fiber 610b, or via a wireless link 610c), where the IHMS functionality described herein may be implemented in or integrated into either/both the router 602 and/or the television 620.

Thus, a user can access carrier-specific content or applications, or other content, including visual voice mail and Short Message Service (SMS) messages, pictures in a photo album, music, content stored in a local or remote storage/data repository or stored on one or more networks (e.g., cloud content), video, home content, media/content server(s) or provider(s), e.g., from cable, online media providers, etc. It will be recognized that the above are merely examples, and in no way limiting as to the source(s) of available media/content that may be stored on or streamed via the IMHS 604 or media server.

In other embodiments, an IMHS can similarly interface with media presentation devices within a vehicle as illustrated in FIG. 7A. As shown in FIG. 7A, an IMHS 700 can be placed within a vehicle and may be configured to interface with one or more media presentation devices 720 via, e.g., a WLAN connection such as a WiFi connection, or a Bluetooth® connection, or other appropriate (in this instance, short-range) communication mechanism/standard/protocol.

Applications or functionality that can be available and that may be attractive for in-vehicle use can include turn-by-turn navigation that uses, e.g., a Navigation Interface Module (NIM)-like carrier application, downloading and/or streaming of various types of media, e.g., video, audio, etc., mobile television viewing, web browser, gaming, etc. The IMHS 704 can seamlessly connect to a 4G carrier network, for example, to allow access to the various content associated with the widgets and applications available in a vehicle. Additionally, and when a user returns home or nears a "home" network, the IMHS 704 can be configured to automatically handoff from a WWAN, e.g., 4G carrier network, to an in home network, e.g., WLAN. Thus, a seamless integration between mobile and fixed content access can be created.

Figure 7B:
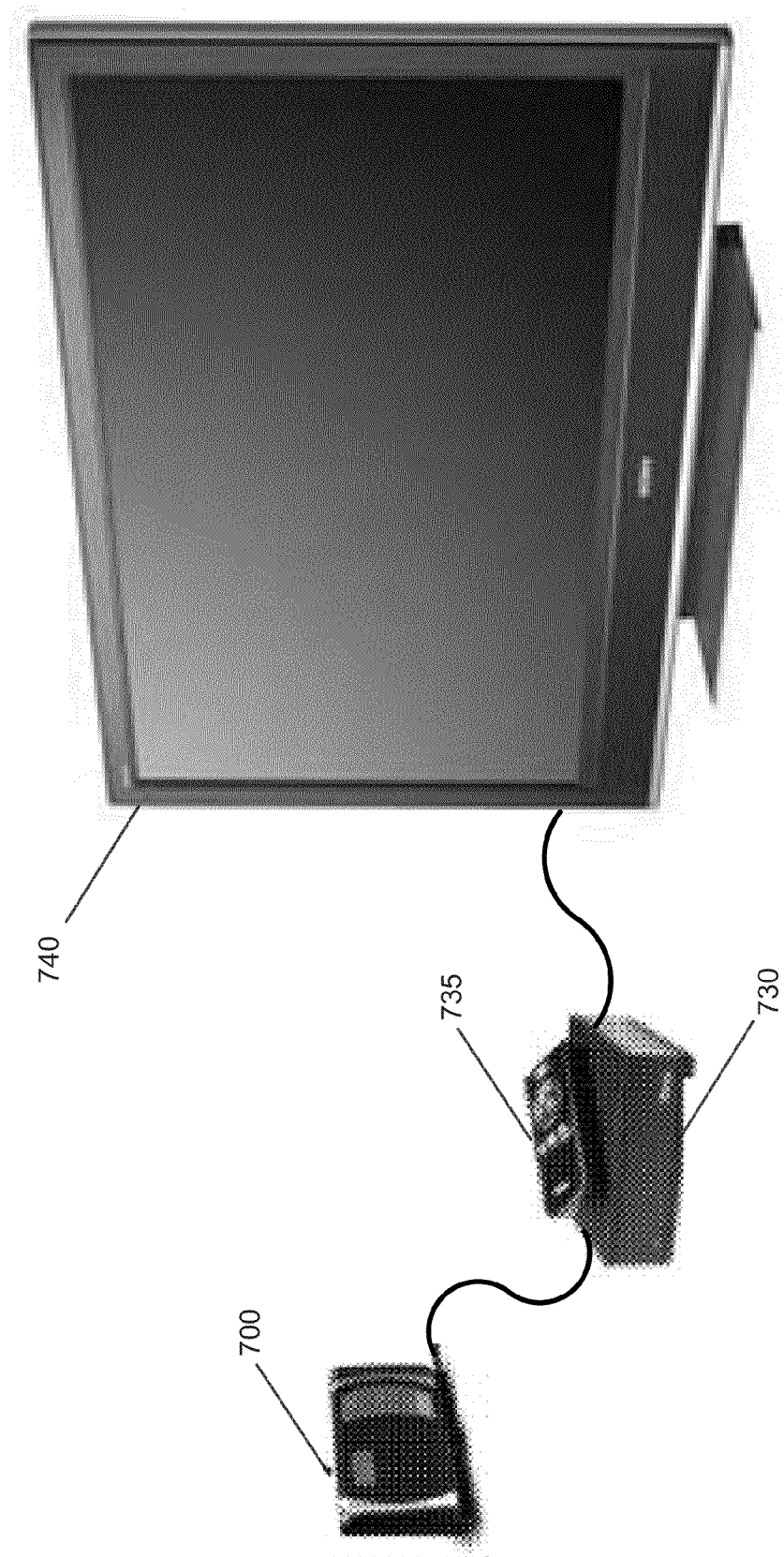
FIG. 7B is a diagram illustrating an example IMHS configured for use with a set-top box and a television.

In other embodiments, and as alluded to previously, an IHMS can interface with more than one downstream device, such as, e.g., an embodiment, where the IMHS may interface with a set-top box, and ultimately, a television. For example, and as illustrated in FIG. 7B, the IMHS 700 may be connected to a set-top box (e.g., cable set-top box) 730 (controllable by a remote control 735), and the set-top box 730 may be connected to a television, monitor, or other display device 740. As also discussed above, the various connections between the IMHS 700, the set-top box 730, and/or the television 740 may be wireless or wired connections.

In still other embodiments, various peripheral devices may actually be replaced by an IMHS. In these embodiments, a peripheral device is complemented, or substituted for with an application or widget that is executable on an IMHS. This allows for simplicity and ease of use; lower cost of acquisition; portability of the apps and services; intelligent determination of mobile vs. fixed environments; agents that allows for matching the service to the environment in terms of, e.g.: resolution (movie, photo), storage limits, throughput, etc. Thus, the IMHS can be capable of seamlessly connecting to a home network or a carrier network and capable of storing and processing content from either network and pushing to, e.g., some media presentation device. The processing of the content depends on the type of network and the type of device connected to the IMHS. In certain embodiments, an intelligent agent capable of matching video resolution to content displayed and peripheral device in use can be included in an IMHS.

Downloading files from a remote computing device or server has become an increasingly popular activity over the last several decades, especially with the increase in household and office Internet use, broadband access, social media websites, e-mail, and compressed multimedia content. The public's perpetual demand for improved download speeds has driven various segments of the market toward more efficient networking solutions. This is especially true with the advent of high definition video formats which present video frames at significantly higher visual quality, but can often require up to eight times the bandwidth to transmit than their standard definition equivalents.

As demand for portable networking devices becomes more prevalent in society, a paradigm shift is expected to occur within the realm of Internet networking, where fixed broadband access mechanisms (such as cable modems and digital subscriber lines) are expected give way to wireless broadband technologies which may utilize, for example, WWAN devices configured to run separate networking protocols. These WWAN devices can utilize cellular connections in order to enable a user to have a mobile Internet hotspot.

Figure 8A:
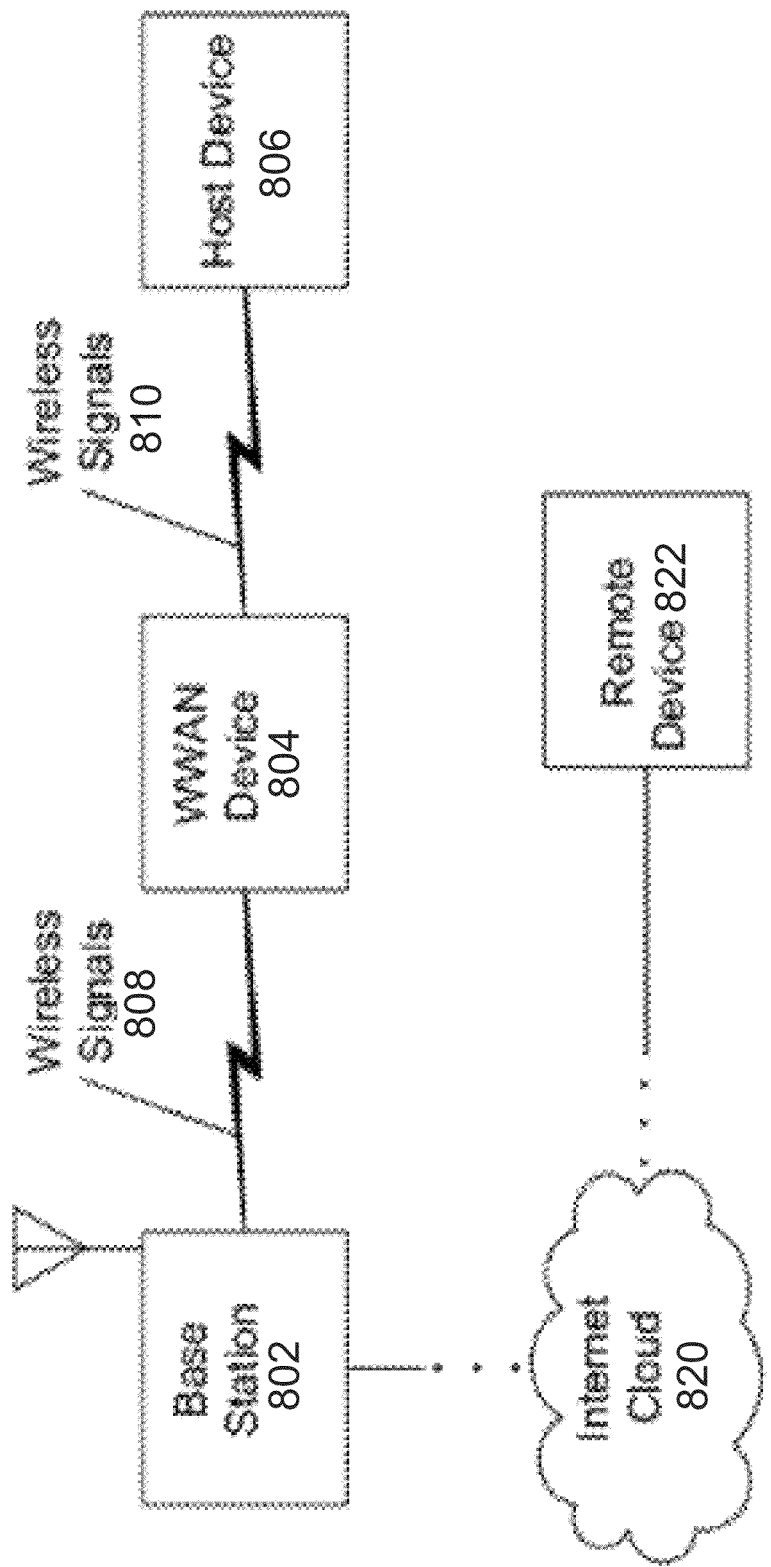
FIGS. 8A-8C are diagrams illustrating example network topologies in which a WWAN device for routing streaming media may operate in accordance with various embodiments.
Figure 8B:
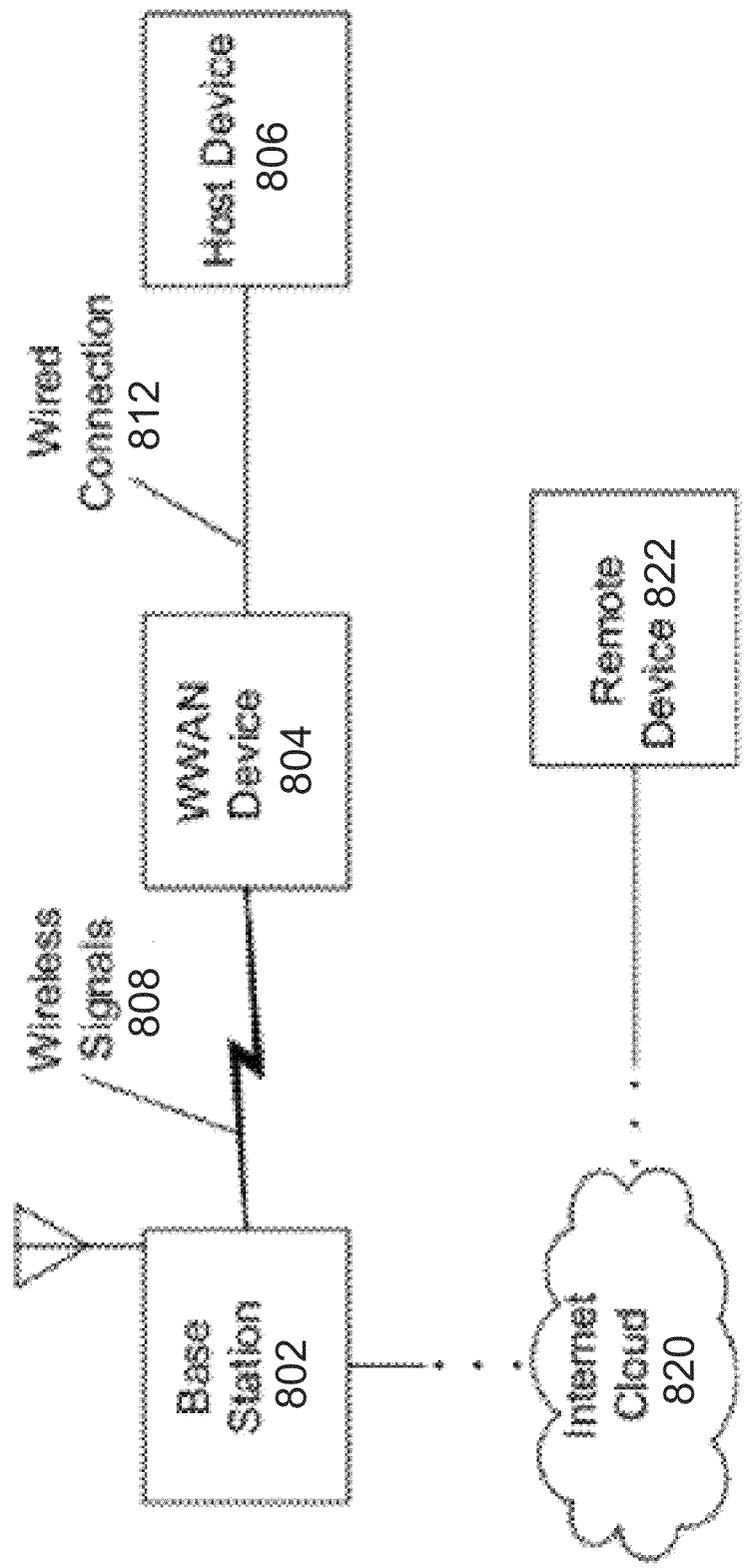
Figure 8C:
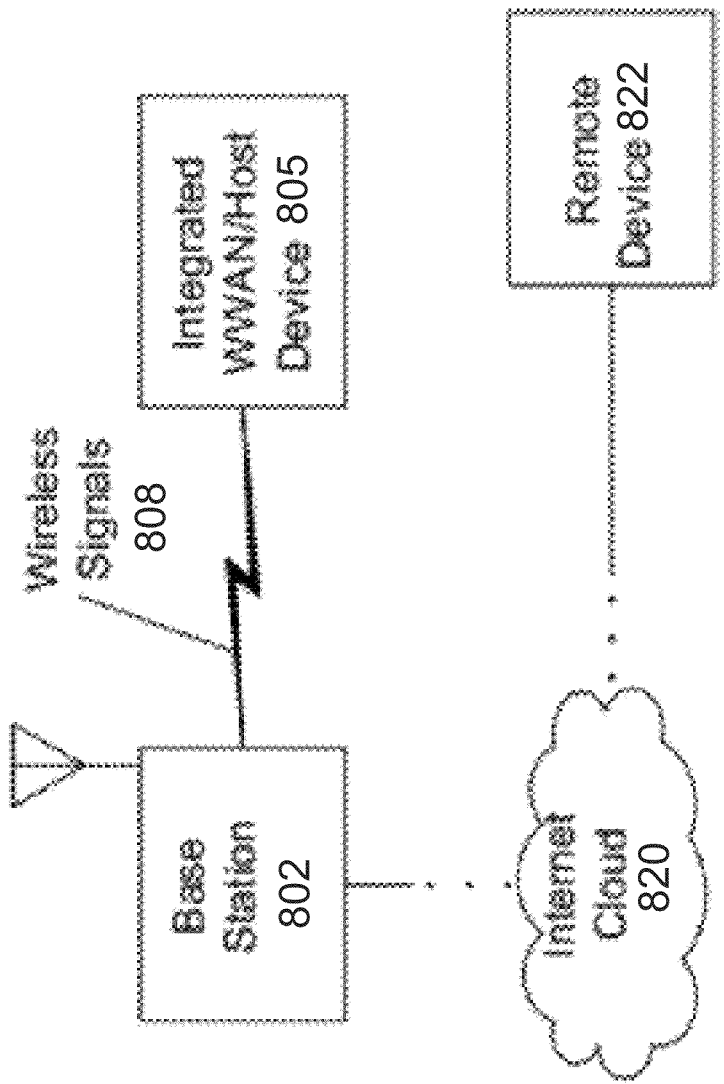

FIGS. 8A-8C illustrate example network topologies for supporting such increased download/streaming throughput in a WWAN environment according to various embodiments. This WWAN environment can be configured to implement any number of networking protocols, including those previously described.

Referring to FIG. 8A, a WWAN device 804 (which may include, for example, some or all of the features of an IMHS detailed above) can be adapted to wirelessly bridge a host computing device 806 with a cellular base station 802. Depending upon the configuration that is selected, the wireless interface between the base station 802 and the WWAN device 804 may be the same or different interface as the interface used between the WWAN device 804 and the host computing device 806. Therefore, the wireless signals 808 and 810 may contain data of a similar or different format according to various embodiments. According to some embodiments, the host computing device 806 may connect with the WWAN device 804 over a WiFi or Bluetooth® connection, while the WWAN device 804 may connect with the base station 802 over, e.g., PPP.

The base station 802 and WWAN device 804 may therefore enable host computing device 806 to access one or more files stored within a remote device 822 that is connected to a data network, such as the Internet. Communication between the remote device 822 and the base station 802 may occur through one or more intermediary nodes (referred to generally \as Internet Cloud 820) according to various embodiments.

FIG. 8B depicts an alternative network topology according to another embodiment. In FIG. 8B, the host computing device 806 may be connected to the WWAN device 804 by a wired connection 812 as opposed to a wireless connection (e.g., wireless connection 810 of FIG. 8A). Any type of wired connection interface may be used for this purpose. For example, a high-speed serial bus protocol (such as USB or FireWire) may be used to directly interface the host computing device 806 with the WWAN device 804.

FIG. 8C depicts yet another alternative network configuration in accordance with another embodiment. According to such an embodiment, the functionality of the host computing device 806 can be integrated within the WWAN device 804 so as to form an integrated WWAN/host computing device 805. According to this arrangement, the integrated WWAN/host computing device 805 depicted in FIG. 8C (which may be, for example, a cellular phone, tablet, or laptop computer) can be used to interface with the base station 802, and ultimately the remote device 822.

Although FIG. 8A-8C depict various network configurations for enabling a host computing device 806 access to, e.g., a media file stored within remote device 822/receiving streaming media from remote device 822 that is connected to the Internet, it is to be understood that the present invention encompasses remote devices 822 that may be situated on any type of network, not necessarily the Internet. For example, the remote device 822 may be an electronic phone accessible over a telecommunications network (circuit or packet switched). Additionally, although FIGS. 8A-8C generally depict a base station 802 configured to communicate with the WWAN device 804 on a cellular network, it is to be understood that the following embodiments may be generalized to a wide variety of other network configurations (including, without limitation, hybrid-fiber optic cable networks, local area networks, and metropolitan area networks).

As described above, and as WWAN data availability increases, the potential for media streaming devices, such as an IMHS (detailed above), to use WWAN links to transport a media stream also increases. WWAN links, similarly to most Internet (or other data network) links are resources that generally are shared amongst many users. Accordingly, being a shared resource, utilizing WWAN links efficiently becomes important. That is, it would be advantageous to minimize the rate of data consumption over WWAN links with regard to those users that are not "actively" utilizing the media being streamed over such WWAN links, thereby freeing the WWAN network and allowing for greater data throughput and connection reliability for active users, not to mention increasing WWAN network capacity can be expensive for WWAN carriers/providers.

For example, and to the above, when an IMHS is used as a media streaming device to stream, e.g., music over WWAN links, to a media presentation device (e.g., downstream device), such as an audio amplifier, and a user turns off his/her audio amplifier, but fails to stop/halt or turn off the media streaming device, music may continue to be streamed even though it is not being output. Such a scenario may be indicative of wasteful WWAN resource usage in that the WWAN links continue to be used to stream media even though it is not ultimately being consumed (listened to) by a user. Another example of wasteful WWAN resource usage may be illustrated in a scenario where a user is streaming video to a media presentation device, such as a television display, but the user turns away for some period of time, i.e., the user no longer is "viewing" the streaming video. In such a scenario, the quality of the streaming video becomes less important, as the quality is irrelevant when the user is inattentive to the streaming video.

It should be noted that although the above example scenarios have been described in the context of wireless media consumption, wired resources, such as wired Internet connections, may similarly experience wasteful usage under the same or similar circumstances. Accordingly, and as alluded to above, dynamic QoS control of streaming media using local environment feedback (as will be described in greater detail below) may also be applied to more efficiently utilizing wired resources.

Certain systems may use some form of dynamic adjustment with respect to streaming media. However, such systems often merely rely upon feedback that is related to connection quality only. In other words, if a user has a fast connection, the quality of the media being streamed over the fast connection may be greater than that being streamed over a slower connection. That is, current technology may be characterized as being based upon media streaming devices being "greedy," i.e., such media streaming devices attempt to consume as much data as possible over a connection, given the constraints of that connection, and usually, a maximum allowable data rate. In other words, behavior of a user (such as that described above) is not taken into account, nor is the local environment monitored to detect ways in which data consumption can be reduced in order to benefit other users on the same network.

Even in systems where a media presentation device can be configured to automatically shut down/enter a sleep mode once a media stream has finished being presented or has been idle for some predetermined period of time only addresses power or energy savings, but fails to address data rate or the amount of data being transferred over shared network resources, such as WWAN links. For example, and referring back to the scenario where a user turns away from a television display that is displaying streaming video, the media streaming device may still be thought of as being greedy, i.e., consuming as much data as possible until streaming of the streaming media is complete. Additionally, and in the case of continuous media streams that may not necessarily have an "end point," such as streaming radio, conventional systems allow the streaming audio (e.g., Internet radio content) to continually be streamed regardless of whether or not a user is actually listening to the streaming audio. Again, allowing for the unmitigated streaming of media in such a scenario may be wasting shared network resources.

In accordance with various embodiments, a media streaming device, such as the IMHS detailed above, may utilize a feedback algorithm that can take into consideration at least one of feedback from monitoring the local environment in which the media streaming device operates, and user attentiveness/behavior, which may be monitored as part of the local environment monitoring. Based on the monitored local environment and/or user behavior (which can be indicative of attentiveness to streaming media), the QoS of streaming media may be reduced in order to conserve/more efficiently utilize shared network resources, such as WWAN links. Further still, various components of the media streaming device may have buffering capability, with the ability to store a predefined amount of streaming media. By passing this amount of data in a single burst, devices, such as downstream devices, may power down all or some their functionality until that data has been consumed.

The media streaming device may be configured to receive streaming media (e.g., audio, video, or other streamable content) from a media source, and to output the media to a downstream device(s), where the downstream device can be configured to present or otherwise allow consumption of the media to/by one or more users. Referring back to FIGS. 6A-6D, 7A, and 7B, the media streaming device may be an embodiment of the IMHS 604 or the IMHS 700, respectively. Referring back to FIGS. 8A-8C, the media streaming device may be an embodiment of the WWAN device 804.

In particular, the media streaming device can accept a stream of media data (analog or digital) and relay/route or create an output to one or more downstream devices. Such output may include, but is not limited to audio, video/visual data, or other media content. It should be noted that the output quality can be related to a data rate of the stream of media data being transmitted/input to the media streaming device. Accordingly, a lower input data rate can result in. e.g., a lesser rendering of the original/source media content (lesser QoS), whereas a higher input data rate can result in a better rending of the original media stream (higher QoS). For example, adaptive bitrate streaming techniques may be utilized to encode (or re-encode or transcode) the original/source media content at multiple bit rates, and streamed. In accordance with various embodiments (and as will be discussed in greater detail below), the streaming media can be requested (from a media source) or provided at differing bit rates depending on a desired or determined QoS based on at least one of local environment feedback and user behavior.

In accordance with certain embodiments, the media streaming device may stream media from a media source, e.g., a media server, a carrier or provider server, etc. In accordance with other embodiments, the media streaming device may itself act as a media source. As described above, an IMHS, for example, may include one or more memory units that can be configured to store, e.g., media content. For example, and referring back to FIGS. 8A-8C, such a media source may be the remote device 822 or some other media source located in the Internet cloud 820. Accordingly, and in the context of adaptive bitrate streaming, the media source may encode the original/source media content at multiple bit rates, and the media streaming device may request streaming media encoded at a particular one of the multiple bit rates.

When the media streaming device acts as a media source, streaming media may be received or obtained from a media source, such as the remote device 822 or some other media source located in the Internet cloud 820, and stored on the media streaming device. Alternatively, media may be downloaded or stored on the media streaming device by, e.g., a user, a media provider, or some similar entity. Ultimately, the media streaming device may itself encode/re-encode or transcode the original/source media content to output to one or more downstream devices.

Again referring back to FIGS. 6A-6D, and 7A, the downstream device may be an embodiment of the television 620 or the media presentation device(s) 720, respectively. Referring back to FIGS. 8A-8C, the downstream device may an embodiment of the host computing device 806. It should be noted that in accordance with certain embodiments, and as alluded to above, the media streaming device may itself be configured to present, e.g., streaming media, without the need for a downstream device. Referring back to FIG. 7B, and in still other embodiments, the media streaming device may be connected to multiple downstream devices, i.e., set-top box 730 and television/display 740. The set-top box may be a cable set-top box or other device that may provide media, such as gaming console, media receiver, etc. that can provide media via Internet services, such as Netflix®, Apple TV®, etc.

In accordance with various embodiments, feedback indicative of the status of the local environment and/or user presence/behavior in which the media streaming device and/or one or more downstream devices operate may be used to determine or adjust at what input data rate/QoS to receive streaming media at which to present the streaming media. For example, and as will be discussed below, if the feedback indicates that a user is or is likely to be actually consuming the streaming media, or requests a higher quality stream, a higher input data rate/higher/QoS may be utilized, whereas if the feedback suggests that user is not being attentive to the streaming media, a lower input data rate/QoS may be utilized.

A plurality of methods for determining the status of the local environment can be used in accordance with various embodiments, including, but not limited to those discussed below. It should be noted that any indication of the status of the local environment can be relied upon as at least one basis for requesting or updating (whether higher or lower) a particular input data rate/QoS associated with streaming media, but a combination of indices may also be utilized to determine an appropriate input data rate/QoS.

One method of determining the status of the local environment may be for the user to physically request a higher quality media streaming. The user, as part of the local environment, may provide some direct input either via the media streaming device or a downstream device, indicating that higher quality content is requested. This request could specify, for example, a desired QoS and a timeframe during which the requested quality is to be maintained, and the QoS that could actually be delivered could be provided to the user.

One method of determining the status of the local environment may be to utilize a microphone to detect any ambient sound that may occur about the media streaming device and/or the one or more downstream devices. Accordingly, a measured sound waveform associated with such ambient sound may be used along with the known streaming media waveform to perform some type of comparison, such as an autocorrelation transformation or audio finger printing algorithm. That is, the ambient sound may be cross-correlated or compared with the streaming media, such that detection criteria may be selected to determine whether or not the result of the autocorrelation suggests that the streaming media sound is present in the local environment. Thus, if the sound associated with the streaming media can be detected in the ambient sound, it may be assumed that a user is actually listening to or otherwise consuming the streaming media. If it cannot be found, it may be assumed that the user is not consuming the streaming media because the downstream device is inactive, e.g., turned off. Accordingly, the streaming media may be paused, terminated, or otherwise presented at a lower QoS (i.e., with a lower input data rate). If the streaming media is being presented at such a lower QoS, and it is determined through comparison that a user has become attentive to the streaming media, the input data bit rate may be increased/the media streaming device may request a higher bit rate encoded version of the streaming media.

Another method of determining the status of the local environment may be to determine whether one or more downstream devices is active. For example, and if the media streaming device is streaming media through, e.g., a local Bluetooth® network, to one or more downstream devices that support Bluetooth® Audio/Video Remote Control Protocol (AVRCP), the Bluetooth® AVRCP functionality may be leveraged to determine if the one or more downstream devices is active. That is, Bluetooth® AVRCP allows a remote control device to interrogate the status of a media presentation/player device. Accordingly, the media streaming device may receive information regarding whether one or more downstream devices is active via an associated remote control device, or the media streaming device may itself, be implemented with Bluetooth® AVRCP functionality so that it can directly interrogate the one or more downstream devices to determine whether or not they are active or inactive. If the one or more downstream devices is active, a higher input data rate/QoS may be utilized, but if the one or more downstream devices are determined to be inactive, a lower input data rate/QoS may be utilized. The bitrate can also be modified based upon the capabilities of the device, including size of screen and audio performance.

Additionally, and as described above, a media streaming device may be connected to one or more downstream devices via a wired connection, cable, etc. In accordance with one method of determining the status of the local environment, mechanical interconnects may be utilized to determine whether the wired connection, cable, etc. is actually connected to one or more downstream devices. For example, if, from a mechanical interconnect, it can be determined that the media streaming device is not connected to a particular downstream device, it may be assumed that there is no active downstream device to present the streaming media. Accordingly the streaming media may be paused, terminated, or its applicable input data rate/QoS downgraded. Again, the converse can result in initiating/re-initiating or upgrading the applicable input data rate/QoS.

Yet another method of determining the status of the local environment may be to determine if a change with respect to devices, such as mobile devices, occurs near or about the media streaming device and/or the one or more downstream devices. That is, certain devices, can provide an indication of their presence in a network. For example, personal area network (e.g., Bluetooth®) devices operative in WLANs (e.g., IEEE 802.11), etc. can broadcast their presence, or their presence can be determined via mechanisms (e.g., device discovery) in the respective protocols upon which such networks operate. Changes in the presence, absence, and/or location of devices in such networks can be used to determine the status of the local environment, and the input data rate/QoS of streaming media can be requested/adjusted as appropriate.

For example, the presence or absence of a device, such as a mobile telephone, smart phone, etc., may be used as an indicator of the presence or absence of a user that may be consuming streaming media. That is, mobile telephone usage has become near-ubiquitous in recent times, and as such, most people have their mobile telephone on or near their person most, if not all of the time. Accordingly, if no mobile telephone is detected in the local environment, it may be assumed that there is no user to consume streaming media from a media streaming device. Conversely, if a mobile telephone is detected, it may be assumed that a user is actively consuming streaming media from a media streaming device, or that a user has arrived, in which case, the input data rate/QoS of streaming media can be increased accordingly, initiated/re-initiated, etc. Moreover, certain metrics such as, e.g., signal strength or relative location of a device, such as a mobile telephone may be used as an indicator of the presence/absence of a user.

In a vehicular context, prolonged lack of movement of the media streaming device and/or one or more downstream devices may be taken as an indicator that a user is not present, and streaming media is not being consumed. Movement may be measured using GPS functionality, one or more sensors such as accelerometers, etc. Such a measurement can further be utilized in conjunction with some type of time and/or other applicable threshold to assume the presence or absence of a user in a vehicle, and accordingly, whether or not to pause, terminate, start, or otherwise adjust the input data rate/QoS of streaming media to a streaming media device within the vehicle. For example, a user may have parked or otherwise stopped the vehicle, but still intends to, e.g., listen to streaming radio. Such considerations may be taken into account in determining what input data rate/QoS to utilize.

Furthermore, and again, in the vehicular context, the status of the local environment may be determined by monitoring the status of the ignition system of a vehicle. That is, if a vehicle has been turned off for some period of time, it may be assumed that there is no user present to consume streaming media within or about the vehicle. The status of the ignition system can be determined, e.g., through queries made to an On Board Diagnostic system of the vehicle, or through, e.g., analog voltage measurements of the power system, e.g., via a 12V rail, such as a 12V cigarette lighter adapter power source. Again, the input data rate/QoS of streaming media may be appropriately adjusted, requested, etc. depending upon whether or not the vehicle is determined to be on or off (which can suggest that a user is present or not present).

Still another method of determining the status of the local environment may involve utilizing a camera to detect the presence or absence, or even proximity of a user relative to the media streaming device and/or one or more downstream devices. As previously described, the presence or absence, or proximity, of a user may be used to assess at what input data rate/QoS, streaming media should be streamed, if at all.

As indicated previously, the feedback algorithm may be based on feedback from the local environment, as well as user behavior. That is, the feedback from the local environment may be further refined/augmented by how a user behaves, which for example, may be indicative of how attentive the user is to streaming media from the media streaming device. For example, and as described previously, the lack of presence of a user can result in a determination being made to pause or terminate a stream of media. In accordance with various embodiments, the streaming media may be received at a lower input data rate/QoS if a user is present, but not attentive.

A plurality of methods for determining the behavior of a user can be used in accordance with various embodiments, including, but not limited to those discussed below. It should be noted that any indication of the attentiveness or behavior of a user can be relied upon as at least one basis for requesting or updating (whether higher or lower) a particular input data rate/QoS associated with streaming media, but a combination of indices may also be utilized to determine an appropriate input data rate/QoS.

One method of determining the attentiveness/behavior of a user may involve determining the level of ambient noise (as previously described) relative to the level (e.g., of sound) of the streaming media. For example, if the level of ambient/background noise is high relative to that of the streaming media, it can be assumed that the user is likely to be inattentive or uninterested in the streaming media. Accordingly, the input data rate/QoS of the streaming media may be lowered/lower than if the user was determined to be attentive, which can suggest the need for a higher input data rate/QoS. Further still, the ambient/background noise may be characterized in order to augment the decision criteria (previously discussed in relation to autocorrelation transformation) as to how a media stream may be affected. For example, if it is determined that the user is singing along with a media stream, that may be indicative of user attentiveness that necessitates a higher input data rate/QoS, as opposed to discordant ambient noise, which may suggest that the user is not attentive to the streaming media.

Another method of determining the attentiveness/behavior of a user may involve determining an absolute volume of the streaming media. For example, and as described above, the presence or status of one or more downstream devices can be determined. Accordingly, the absolute volume at which the streaming media is being presented may be determined as well to determine an appropriate input data rate/QoS to be utilized. That is, a higher absolute volume may suggest that the user is especially attentive to that particular media stream, thereby suggesting that the input data rate/QoS should be higher rather than lower (such as with a lower absolute volume, which may suggest that the user is less attentive to the media stream).

Yet another method of determining the attentiveness/behavior of a user may involve biometric tracking relative to the user. For example, tracking eye movement/location, head direction, etc., whether by sensors, cameras, infrared detection, or other suitable biometric tracking technique(s) may be used to determine whether or not a user is, e.g., watching a particular media stream, such as streaming video content. If such biometric tracking is suggestive of the user being attentive (e.g., the eyes are focused on/in the direction of one or more downstream devices or the media streaming device itself), an appropriate input data rate/QoS may be utilized to stream the media.

Further still, changes in geographic location of the local environment can be used to determine the attentiveness/behavior of a user. That is, navigation systems/techniques such as GPS, Global Navigation Satellite System (GLONASS), Beidou, etc. may be used to determine the location of, e.g., fixed RF devices, a vehicle, or that of a downstream device, etc. In a vehicular context, if the geographic location of the local environment is determined to be near a user's home, and is stationary, the input data rate/QoS of streaming media may be reduced as the user may be assumed to be less interested, in, e.g., listening to music being streamed in a car. Conversely, as the geographic location of the local environment moves away from a home location, this can suggest that the user is more attentive to the music being streamed in the car.

Moreover, electromagnetic emissions (EEG) from a user's brain and/or body may be monitored as a method of determining a user's attentiveness/behavior to stimuli, which may include streaming media. Again, the input data rate/QoS of such streaming media may be adjusted and/or the streaming media may be paused, terminated, or started based on such monitored information.

It should be noted that as described above, various embodiments contemplate cases where more than one downstream device may be monitored. Accordingly, various embodiments may employ the above-described feedback algorithm in conjunction with one or more weighting functions to, e.g., determine if one or more of the downstream devices may be more relevant to determining the status of the local environment and/or user attentiveness/behavior. The feedback algorithm may also take into consideration, the location(s) of each or groups of the plurality of downstream devices, which and/or how many of the plurality of downstream devices are active versus inactive, etc. Further still, and regardless of the number of downstream devices that exist in the local environment, the feedback algorithm may employ any number of monitoring times (whether periodic or aperiodic) in conjunction with the methods for determining the status of the local environment and/or user attentiveness/behavior. That is, the feedback algorithm disclosed herein may be enhanced or otherwise augmented with a variety of additional parameters and/or considerations that may be relevant to the status of the local environment and/or user attentiveness/behavior.

Moreover, depending on the feedback received from the local environment and/or the user, the input data rate/QoS of streamed media content may be maintained at a current level, rather than just decreasing or increasing the input data rate/QoS, or pausing, terminating, or initiating/re-initiating the streamed media content. Additionally, and in the case of pausing or terminating the streamed media content, the media streaming device can in certain embodiments deactivate itself and/or the one or more downstream devices.

Referring back to FIG. 7A, and in accordance with one embodiment, a media streaming device (e.g., IMHS 700) may be provided to route streaming media content to a car radio/entertainment system. As illustrated in FIG. 7A, the car radio/entertainment system may have one or more displays for viewing, e.g., streamed video content. It should be noted that the media streaming device, in accordance with other embodiments, may have its own display on which streamed video content may be displayed. The media streaming device can be connected via a WWAN to a communications network, such as a carrier network via, e.g., a base station, as described above, while being connected to the car radio system via a Bluetooth® connection which may provide support for Bluetooth® AVRCP. The media streaming device may use Bluetooth® AVRCP to determine the state of the car radio system (e.g., whether or not the car radio system is active), and also to determine the volume at which streaming media is being played or presented. Additionally still, a microphone (either included in the media streaming device, in the car radio system, or separate from either but capable of monitoring sound in the cabin of the car) may be used to measure the ambient sound to determine background noise levels relative to a desired level (indicated by the volume level of the car radio system), while one or more biometric tracking mechanisms may also be employed to track one or more biometric indicators of user attentiveness/behavior.

In accordance with the feedback algorithm discussed above, and based upon the monitoring of the local environment using Bluetooth® AVRCP and the microphone, streaming media content being, e.g., routed from the media streaming device to the car radio/entertainment system, may be terminated if one or more of the following scenarios arises: the car radio/entertainment system is not active/turned off; the volume of the car radio/entertainment system is set to zero; the car radio/entertainment system is set to an alternate input source (e.g., AM/FM radio, CD, etc.); the car ignition has been in an off state for an extended (pre-determined) period of time; and/or the car has been stationary for an extended (pre-determined) period of time.

The input data rate/QoS of the streamed media content, in the case of audio content, may be reduced from a normal or default level under the following conditions: when the volume of the car radio/entertainment system is set to a low level; and/or there is significant (pre-determined) background noise (e.g., loud talking, sound of a train passing, etc.) In the case of video content, the input data rate/QoS of the streamed media may be reduced from a normal/default level under the following conditions: no user(s) are in a position to watch the video content (which may be determined, e.g., through some form of biometric tracking); and/or if there are no eyes which can be detected to suggest that a user(s) is watching the video content (also determinable, e.g., via some form of biometric tracking).

Referring back to FIG. 7B, and in accordance with another embodiment, a media streaming device (e.g., IMHS 700) may be provided to route streaming media content to a television (e.g., television 740) by way of a set-top box 730 or media transceiver (e.g., cable set-top box, Slingbox®, Roku™ Box, etc.) The connections between the media streaming device 700, the set-top box 730, and the television 740 may be wireless (e.g., via WiFi, Bluetooth®, wireless USB, etc.) or wired (e.g., via wired Ethernet, cable, or other physical/mechanical connection, etc.) The media streaming device may provide relay of streaming media content to the set-top box 730 for display/consumption on the television 740 while monitoring the status of the local environment, e.g., the status of a room (and a user(s) watching the television 740) in which the set-top box 730 and/or television 740 are located. It should be noted that the set-top box 730 and the television 740 need not necessarily be co-located. As described herein, and based on the status of the room and/or the attentiveness of the user(s), the streaming media content may be paused, terminated, initiated/re-initiated, adjust in terms of QoS, etc. This may be advantageous in a variety of scenarios, e.g., in a broadband network through which a user(s) receives data service, cable television service, telephony service, etc., as a reduction in bandwidth consumption in one area of the network can result in increased throughput in another area, for example.

In another embodiment still, the media streaming device, may not necessarily stream/provide streaming media content, but may act as an intermediary device that implements the feedback and monitoring aspects disclosed herein. However, and where the media streaming device is actually streaming media, or acting as an intermediary device, it should be noted that various embodiments allow for data/throughput reduction at any one or more of the media streaming device, a first down stream device, a second downstream device, or any other device within a network in which the media streaming device is operable.

Figure 9:
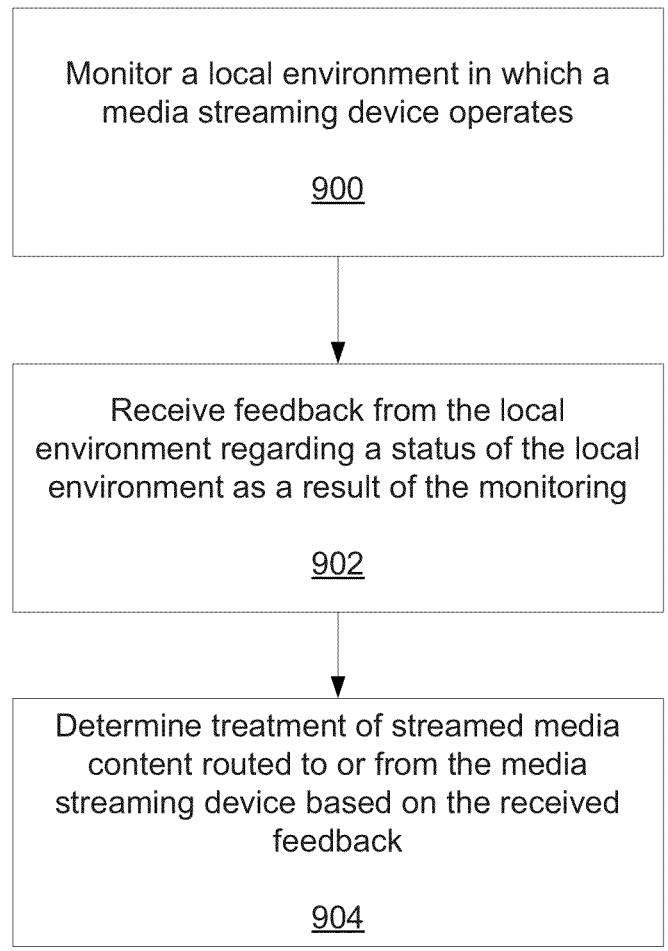
FIG. 9 is a flow chart illustrating example processes for controlling input data rate/quality of service associated with streaming media in accordance with various embodiments.

FIG. 9 illustrates example processes performed in accordance with various embodiments to allow for dynamic QoS control of streaming media. At 900, the local environment in which a media streaming device operates. As described above, various methods of monitoring the local environment may be utilized, e.g., using a microphone to sense ambient or background noise, and comparing it with the sound of streamed media, determining whether one or more downstream devices (if utilized) are on or active, determining whether there is a change in neighboring devices, detecting user presence, determining the status of a vehicle in which the media streaming device is located, etc. At 902, feedback from the local environment regarding a status of the local environment is received as a result of the monitoring. Depending on the type(s) of connections employed in a system/network in which the media streaming device and (if present), the one or more downstream devices, such feedback may be received over a variety of connections/interfaces, whether wirelessly or via some wired/physical connection. At 904, treatment of streamed media contact that is routed to or from the media streaming device is determined based on the status of the local environment. As described above, a feedback algorithm may be utilized to determine whether to decrease, increase, terminate, or initiate the input data rate/QoS associated with the streamed media content depending on the feedback received from the local environment.

As disclosed herein, various embodiments utilize a feedback algorithm that can receive and analyze feedback information received from the local environment in which a media streaming device and/or one or more downstream devices operate to determine how to treat streamed media content. The feedback algorithm may be augmented by information associated with user attentiveness or behavior. In determining how to treat streamed media content, the impact of streaming media devices on network loading can be reduced by appropriately treating streaming media in accordance with the status of the local environment and/or a user (or users) attentiveness, behavior or device interaction with respect to that streaming media. This can be particularly critical in scenarios where network capacity and resources are limited, expensive to increase, etc., and the amount of streaming media content pushed through the network is a significant percentage of the network load. In fact, in any network, utilizing the feedback algorithm as described herein can result in more efficient overall network operation, which is often a desirable effect. Additionally, still, and because a network can be used more efficiently, the effective capacity of the network can be increased, where, e.g., greater average revenue per user for network providers/carriers can be realized as higher quality services can be provided to a greater number of users through better resource sharing. It can also benefit user in the form of reduced data usage and associated costs, and protecting against overages. Moreover, and as alluded to above, reducing bandwidth consumption in one area of a network, e.g., by controlling streaming media routed via a set-top box to a television, may even allow for improved network performance in another area, e.g., data consumption via a computer in a home office.

The various diagrams illustrating various embodiments may depict an example architectural or other configuration for the various embodiments, which is done to aid in understanding the features and functionality that can be included in those embodiments. The present disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement various embodiments. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

It should be understood that the various features, aspects and/or functionality described in one or more of the individual embodiments are not limited in their applicability to the particular embodiment with which they are described, but instead can be applied, alone or in various combinations, to one or more of the other embodiments, whether or not such embodiments are described and whether or not such features, aspects and/or functionality is presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in, e.g., a non-transitory computer-readable memory, including computer-executable instructions, such as program code, executed by computers in networked environments. A computer-readable memory may include removable and non-removable storage devices including, but not limited to, ROM, RAM, compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As used herein, the term module can describe a given unit of functionality that can be performed in accordance with one or more embodiments. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the invention are implemented in whole or in part using software, in one embodiment, these software elements can be implemented to operate with a computing or processing module capable of carrying out the functionality described with respect thereto. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
monitoring a local environment in which a media streaming device operates;
receiving feedback from the local environment regarding a status of the local environment as a result of the monitoring; and
determining treatment of streamed media content routed to or from the media streaming device based on the status of the local environment, wherein the monitoring of the local environment is selected from the group consisting of:
sensing ambient sound in the local environment, and comparing the sensed ambient sound with a known waveform associated with the streamed media content;
determining if a change has occurred with respect to presence, absence, or location of neighboring mobile devices within the local environment; or
determining an ignition system status of a vehicle in which at least one of the media streaming device and a downstream device to which the streamed media content is routed from the media streaming device is located.

2. The method of claim 1, wherein the monitoring of the local environment further comprises determining if a downstream device to which the streamed media content is routed from the media streaming device is active or is physically connected to the media streaming device.

3. The method of claim 1, wherein the monitoring of the local environment further comprises determining if there has been an occurrence of prolonged lack of movement of at least one of the media streaming device and a downstream device to which the streamed media content is routed from the media streaming device.

4. The method of claim 1, wherein the monitoring of the local environment further comprises determining whether a user is present proximate to the location of at least one of the media streaming device and a downstream device to which the streamed media content is routed from the media streaming device.

5. The method of claim 1, wherein the monitoring of the local environment further comprises determining the availability and quality of one or more data paths over which the streamed media content is routed.

6. The method of claim 1 further comprising, monitoring behavior of a user, and receiving additional feedback indicative of the attentiveness of the user with respect to the streamed media content.

7. The method of claim 6, wherein the feedback is provided via a direct input from the user.

8. The method of claim 6 further comprising, augmenting the received feedback from the local environment with the received additional feedback to refine the treatment of the streamed media content.

9. The method of claim 6, wherein the monitoring of the behavior of the user comprises comparing ambient noise within the local environment and volume level associated with the streamed media content.

10. The method of claim 6, wherein the monitoring of the behavior of the user comprises detecting an absolute volume level associated with the streamed media content.

11. The method of claim 6, wherein the monitoring of the behavior of the user comprises performing biometric tracking to determine the attentiveness of the user.

12. The method of claim 1, wherein the treatment of the streamed media content comprises one of reducing the quality of service associated with the streamed media content, increasing the quality of service associated with the streamed media content, maintaining a current quality of service associated with the streamed media content, pausing the streamed media content, terminating the streamed media content, initiating the streamed media content, or re-initiating the streamed media content.

13. The method of claim 1, where the treatment of the streamed media content comprises transmitting a predefined quantity of the streamed media content in bursts.

14. The method of claim 1, wherein the local environment comprises at least one of a vehicle, a home environment, an office environment, and a mobile hotspot environment.

15. The method of claim 1, wherein the media streaming device is operatively connected to at least one downstream device to which the streamed media content is routed via one of a wireless Local Area Network (WLAN), a wireless USB network, an ultrawideband network, a Bluetooth network, an Ethernet network, a Zigbee network, an infrared connection, or a wired connection.

16. The method of claim 1, wherein the media streaming device is operatively connected to at least one of a wireless Wide Area Network (WWAN), a WiMAX network, a Long Term Evolution (LTE) network, and a 4G network.

17. A method, comprising:
monitoring a local environment in which a media streaming device operates;
receiving feedback from the local environment regarding a status of the local environment as a result of the monitoring;

determining treatment of streamed media content routed to or from the media streaming device based on the status of the local environment; and monitoring behavior of a user, and receiving additional feedback indicative of the attentiveness of the user with respect to the streamed media content, wherein the monitoring of the behavior of the user is selected from the group consisting of:

comparing ambient noise within the local environment and volume level associated with the streamed media content; or performing biometric tracking to determine the attentiveness of the user.

18. The method of claim 17, wherein the monitoring of the local environment comprises sensing ambient sound in the local environment, and comparing the sensed ambient sound with a known waveform associated with the streamed media content.

19. The method of claim 17, wherein the monitoring of the local environment comprises determining if a downstream device to which the streamed media content is routed from the media streaming device is active or is physically connected to the media streaming device.

20. The method of claim 17, wherein the monitoring of the local environment comprises determining if a change has occurred with respect to presence, absence, or location of neighboring mobile devices within the local environment.

21. The method of claim 17, wherein the monitoring of the local environment comprises determining if there has been an occurrence of prolonged lack of movement of at least one of the media streaming device and a downstream device to which the streamed media content is routed from the media streaming device.

22. The method of claim 17, wherein the monitoring of the local environment comprises determining an ignition system status of a vehicle in which at least one of the media streaming device and a downstream device to which the streamed media content is routed from the media streaming device is located.

23. The method of claim 17, wherein the monitoring of the local environment comprises determining whether a user is present proximate to the location of at least one of the media streaming device and a downstream device to which the streamed media content is routed from the media streaming device.

24. The method of claim 17, wherein the monitoring of the local environment comprises determining the availability and quality of one or more data paths over which the streamed media content is routed.

25. The method of claim 17, wherein the feedback is provided via a direct input from the user.

26. The method of claim 17 further comprising, augmenting the received feedback from the local environment with the received additional feedback to refine the treatment of the streamed media content.

27. The method of claim 17, wherein the monitoring of the behavior of the user further comprises detecting an absolute volume level associated with the streamed media content.

28. The method of claim 17, wherein the treatment of the streamed media content comprises one of reducing the quality of service associated with the streamed media content, increasing the quality of service associated with the streamed media content, maintaining a current quality of service associated with the streamed media content, pausing the streamed media content, terminating the streamed media content, initiating the streamed media content, or re-initiating the streamed media content.

29. The method of claim 17, where the treatment of the streamed media content comprises transmitting a predefined quantity of the streamed media content in bursts.

30. The method of claim 17, wherein the local environment comprises at least one of a vehicle, a home environment, an office environment, and a mobile hotspot environment.

31. The method of claim 17, wherein the media streaming device is operatively connected to at least one downstream device to which the streamed media content is routed via one of a wireless Local Area Network (WLAN), a wireless USB network, an ultrawideband network, a Bluetooth network, an Ethernet network, a Zigbee network, an infrared connection, or a wired connection.

32. The method of claim 17, wherein the media streaming device is operatively connected to at least one of a wireless Wide Area Network (WWAN), a WiMAX network, a Long Term Evolution (LTE) network, and a 4G network.

\* \* \* \* \*